United States Patent [19]

Nishimura et al.

[11] 3,763,360

[45] Oct. 2, 1973

[54] MACHINE CONTROL APPARATUS FOR A COMPUTER CONTROLLED MACHINE TOOL SYSTEM

[75] Inventors: Hideo Nishimura; Kimio Kano; Tamotsu Ishigaki, all of Kariya, Japan

[73] Assignee: Toyoda Koki Kabushiki Kaisha, Kariya-shi, Aichi-ken, Japan

[22] Filed: Sept. 5, 1972

[21] Appl. No.: 286,088

[30] Foreign Application Priority Data
Sept. 9, 1971 Japan................................ 46/70022

[52] U.S. Cl........... 235/151.11, 340/172.5, 318/603
[51] Int. Cl. ............................................ G05b 19/28
[58] Field of Search ................................ 340/172.5; 235/151.11; 318/603

[56] References Cited
UNITED STATES PATENTS
3,555,392  1/1971  Reuteler ............................ 318/603
3,668,500  6/1972  Kosem ................................ 318/603

*Primary Examiner*—Eugene G. Botz
*Attorney*—Norman F. Oblon et al.

[57] ABSTRACT

The control of a plurality of machine tools by a single small capacity computer is disclosed.

The single computer is connected with a plurality of machine control apparatus which may register the computer calculated data for the use of the machine tools. While a machine tool or machine tools are operated by the data registered on the control apparatus, the computer calculates the data for other machine tools, whereby the single small capacity computer may control a plurality of machine tools.

12 Claims, 4 Drawing Figures

X AXIS PULSE DISTRIBUTION

Y AXIS PULSE DISTRIBUTION

MACHINE CONTROL APPARATUS FOR A COMPUTER CONTROLLED MACHINE TOOL SYSTEM

BACKGROUND OF THE INVENTION

1. Field Of The Invention

The present invention relates generally to machine control apparatus for a computer controlled machine tool system and more particularly to an improved machine control apparatus which reduces the load applied on a computer so that a single small capacity computer may control a plurality of machine tools.

2. Description Of The Prior Art

Conventionally, there are generally two techniques which have been used in a computer controlled machine tool system. In one technique the machine tools and the controlling computer are connected with each other through an interpolater. In the other technique the computer is directly connected to the machine tools and would calculate or interpolate data applied thereto into such a form that the machine tools could use the data. Hereinafter, the data which is supplied to the computer will be referred to as computer control data or CC data and the data which is calculated by the computer into such a form that the machine tools may use the same will be referred to an interpolation or interpolated data.

While somewhat satisfactory, one of the problems with the first technique above was that each of the machine tools had to be equipped with a separate interpolater and thereby the cost of the system was greatly increased. Again while somewhat satisfactory, one problem with the second technique above is that the computer used could not control many machine tools, since the computer had to interpolate the CC data and supply the interpolated data to the machine tools every time a drive pulse was supplied to the machine tools. Thus, the computer was occupied by controlling a small number of the axes of the machine tools.

SUMMARY OF THE INVENTION

It is therefore an object of the present invention to provide a new and improved machine control apparatus which increases the number of machine tools that may be controlled by a single computer.

Another object of the invention is to provide a new and improved machine control apparatus which may register the interpolation data to temporarily control the machine tool or machine tools.

Still another object of the present invention is to provide a new and improved machine control apparatus which makes the system controlled by the computer simple to construct, and inexpensive to manufacture.

The foregoing and other objectives are achieved according to this invention through the provision of a plurality of machine control apparatus which are connected to a single computer. Each of the separate machine control apparatus is provided with a plurality of shift registers to which the interpolation data are transmitted from the computer. While one machine is controlled according to the interpolation data on the shift registers, the computer may process the CC data for other machine tools, whereby the single computer is of a small capacity and may control a plurality of machine tools even if operations, such as contouring, are required.

BRIEF DESCRIPTION OF THE DRAWINGS

Various other objects, features and attendant advantages of the present invention will be more fully appreciated as the same becomes better understood from the following detailed description when considered in connection with the accompanying drawings, in which like reference characters designate like or corresponding parts throughout the several views and wherein.

DETAILED DESCRIPTION OF THE PREFERRED EMBODIMENTS

Figure 1:
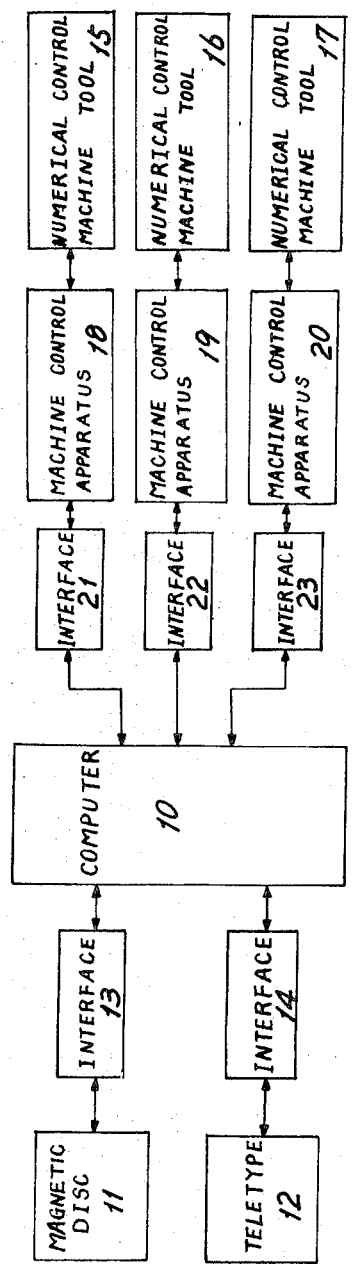
FIG. 1 is a schematic diagram showing a computer controlled machine tool system.

Referring now to the drawings, and more particularly to FIG. 1 thereof, a conventional memory means such as, for example, a magnetic disc 11 and a conventional input means such as, for example, a teletype 12 are shown as being connected to a computer 10 through appropriate and conventional interfaces 13, 14 such for example as a basic I disc control Nova model by Data General Corporation and a basic I control Nova made by Data General Corporation. The CC data stored on the magnetic disc 11 is processed by the computer 10 and the processed data, that is, the interpolation data is fed through conventional interfaces 21, 22, 23, such for example as general purpose interface Nova models by Data General Corporation, to machine control apparatus 18, 19, 20 which, in turn, control respective and conventional numerically controlled machine tools 15, 16, 17.

It is noted that the computer 10, in this case, is a so called conventional mini-computer of small capacity, such for example as a Data General Corporation Nova computer, and that the machine tools and the machine control apparatus are not limited to the three as shown.

The present invention is primarily directed to the machine control apparatus 18, 19, 20, and the same will now be described in detail with reference to FIG. 2.

Figure 2:
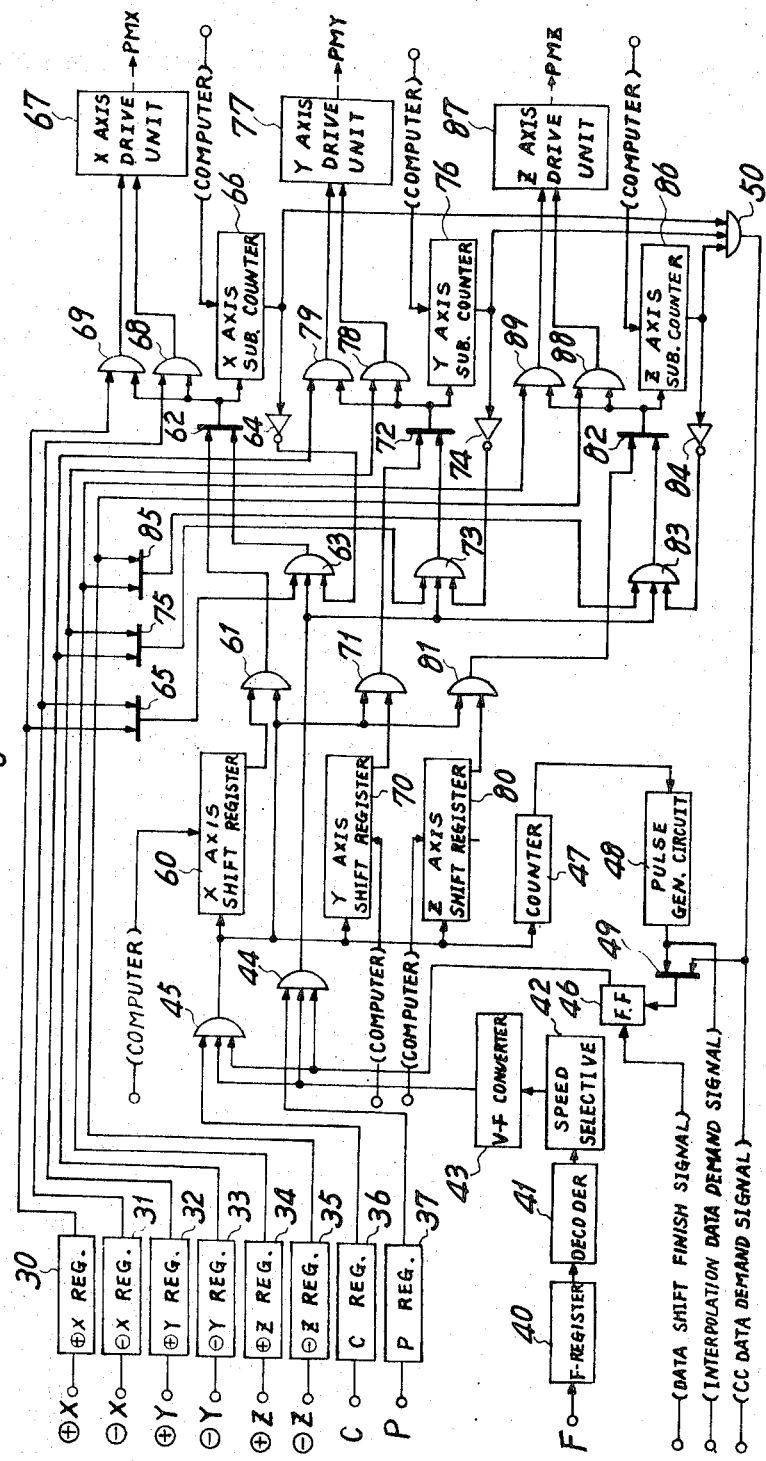
FIG. 2 is a circuit diagram showing a machine control apparatus according to the present invention.

In FIG. 2, registers 30 through 37 are respectively applied from the computer 10 with command signals +X, −X, +Y, −Y, +Z, −Z, C, P The command signals +X, +Y, +Z are respectively indicative of directional command signals for the X, Y, Z axes of the machine tool toward a plus or positive direction. The command signals −X, −Y, −Z are respectively indicative of the same, but towards a minus or negative direction. The command signals C, P are respectively indicative of a contouring and a point-to-point control.

Numeral 40 indicates a F-register which receives a binary coded speed signal F from the computer 10 and then supplies it to a decoder 41. A speed selective circuit 42 provides an electric voltage proportional to the speed signal F to a V-F converter 43 which, in turn, supplies a series of equally spaced clock pulses in a frequency proportional to the electric voltage to AND-gates 44, 45.

The AND-gate 44 passes the clock pulse signals to AND-gates 63, 73, 83 when a command signal P from the P-register 37 and a set signal from a flip-flop 46 are further applied thereto. The AND-gate 45 passes the clock pulse signals to a X-axis shift register 60, a Y-axis shift register 70, a Z-axis shift register 80, a counter 47 and AND-gates 61, 71, 81 when a command signal C from the C-register 36 and a set signal from the flip-flop 46 are additionally supplied thereto as well as the clock pulses.

The shift registers 60, 70, 80 are operably connected to the computer 10 and are of a conventional type having a plurality of bits, for example, N bits. Accordingly, the computer 10 supplies the interpolation data by N bits or one word at a time.

It is to be appreciated that the computer 10 may interpolate more than one word and store the interpolated data on the memory means thereof. Let's suppose, in this particular case, one word consists of N bits, since the shift registers 60, 70, 80 have N bits. One word by one word of the stored data in the computer 10 is then shifted to the appropriate shift registers.

The counter 47 will provide a signal each time N clock pulses have been applied to each of the shift registers 60, 70, 80. A pulse generating circuit 48 will, in turn, transmit an interpolation data demand signal to the computer 10 so that the computer 10 will then provide next new words to the appropriate shift registers.

The AND-gates 61, 71, 81 are respectively connected to the shift registers 60, 70, 80 at the input terminals thereof and to AND-gate 45 at the other input terminals thereof. The AND-gates 61, 71, 81 respectively supply drive pulses to OR-gates 62, 72, 82 when they are supplied with clock pulse signals from the AND-gate 45 and with the output signal "1" from the shift registers 60, 70, 80. The OR-gates 62, 72, 82 may also receive a signal "1" from the AND-gates 63, 73, 83 which are, in turn, respectively connected to the AND-gate 44, the NOT-gates 64, 74, 84 and the OR-gates 65, 75, 85. The OR-gates 65, 75, 85 are respectively fed with output signals from registers 30 and 31, 32 and 33, 34 and 35. Accordingly, the AND-gates 63, 73, 83 will pass the clock pulse signals from the AND-gate 44 to the OR-gates 62, 72, 82 when a signal "1" is applied by the respectively associated OR-gates 65, 75, 85 and the NOT-gates 64, 74, 84.

The output terminal of the OR-gate 62 is connected to a X axis subtracting counter 66 and AND-gates 68, 69, the input terminals of which are respectively connected to the −X register 31, the +X register 30, and the output terminals of which are connected to a X axis drive unit 67. Similarly, the OR-circuits 72, 82 are respectively connected to a Y axis subtracting counter 76 and AND-gates 78, 79, a Z axis subtracting counter 86 and AND-gates 88, 89. The AND-gates 78, 79 are also respectively connected to the −Y register and +Y register at the input terminals thereof and at the output terminals thereof to a Y axis drive unit 77. The AND-gates 88, 89 are respectively connected to the −Z register 35 and the +Z register 34 at the input terminals thereof and at the output terminals thereof to a Z axis drive unit 87. Accordingly, when the AND condition is satisfied for the AND-gate 68, then the AND-gate 68 will supply drive pulses to the X axis drive unit 67 to rotate a pulse motor PMX (not shown) in a minus or counter-clockwise direction and the AND-gate 69, in a similar condition will perform to rotate the pulse motor PMX in a plus or clockwise direction. Similarly, AND-gates 78 and 79, 88 and 89 will provide drive pulses to the Y, Z axis drive units 77, 87 to rotate the pulse motors PMY, PMZ.

The subtracting counters 66, 76, 86 are supplied with a predetermined feed amount for each axis for example, one block of CC data and such feed amount is binary coded and registered thereon. The registered feed amount is subtracted one pulse by one pulse each time the drive pulses are supplied to the subtractors 66, 76, 86 from the OR-gates 62, 72, 82. The output terminals of the subtracting registers 66, 76, 86 are respectively connected to the NOT-gate 64 and the AND-gate 50, the NOT-gate 74 and the AND-gate 50, the NOT-gate 84 and the AND-gate 50. The subtracting registers 66, 76, 86 issue a signal "1" through the output terminal thereof when the contents therein are subtracted into nothing. Therefore, the outputs from the NOT-gates 64, 74, 84 to the AND-gates 63, 73, 83 become "0," and thus, the applications of the drive pulse to the drive units 67, 77, 87 are ceased. The AND-gate 50 feeds a signal to the OR-gate 49 to thereby reset the flip-flop 46 and also supplies a CC data demand signal for ordering the computer 10 to provide new word interpolated from the next new block of CC data to the shift registers 60, 70, 80 when the contents of all the subtracting counters 66, 76, 86 are reduced into nothing.

Figure 3:
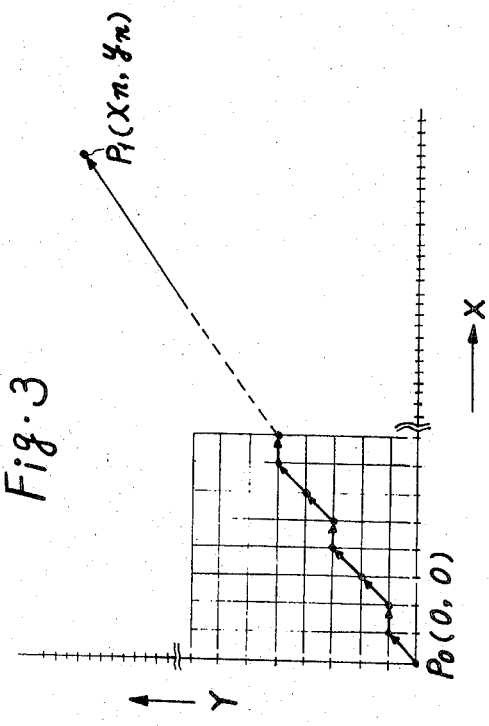
FIG. 3 is a graph showing a pulse distributing method for a straight line contouring operation.

The operation of the present invention, wherein, for example, a contouring operation along the straight line PoP1 as shown in FIG. 3 is performed is described hereinunder. CC data including the coordinate values ($Xn$, $Yn$) of the point P1 and other necessary information are applied to the computer 10 which, in turn, processes the CC data into the interpolation data according to the pulse distribution method such as, for example, the method described in Japanese Publication 1209/1971. It is to be noted that any kind of pulse distribution method may be employed and thus is not essential matter for an understanding of the present invention.

In this particular data processing method, the computer 10 provides the interpolation data so that drive pulses are supplied continuously along the axis of which the coordinate value is bigger than that of the other axis. As to the pulse distribution along the axis of which the coordinate value is smaller than that of the other axis, the computer 10 will interpolate the CC data into the interpolation data according to the following relationships:

$Xn < Yn$, ½(pulse interval) $\geq (Xn/Yn)Y-X \geq -$½(pulse interval)

$Xn > Yn$, ½(pulse interval) $\geq (Yn/Xn) X-Y \geq = $ ½(pulse interval)

Figure 4:
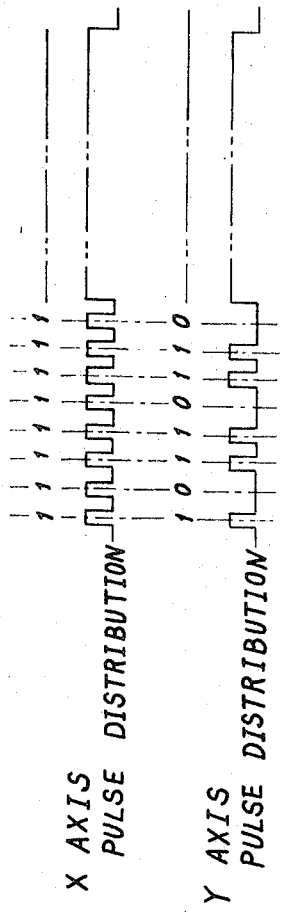
FIG. 4 shows the sequence of pulse distribution for the contouring operation shown in FIG. 3.

The interpolated data processed according to the above consists of equally spaced regular pulses along the bigger value axis (in this case the X axis) and of irregular pulses along the smaller value axis (in this case the Y axis) as shown in FIG. 4.

When supplied with a CC data demand signal from the AND-gate 50, the computer 10 will read one block of CC data on the magnetic disc 11 and interpolate the CC data into the interpolation data for the X, y, Z axes and store the interpolation data on the memory means thereof. The stored data on the computer 10 is supplied to the machine control apparatus 18, 19, 20 together with the other necessary informations in a predetermined sequence.

Firstly, a speed signal F is transfered to the F-register 40 and thus, the V-F converter 43 will supply the AND-gates 44, 45 with equally spaced clock pulses in the frequency determined by the speed signal F. Secondly, plus direction command signals +X, +Y and a contouring command signal C are respectively supplied to the +X-register 30, the +Y-register 32 and the C-register 36 which, in turn, supply a signal "1" to the AND-gates 69, 79, 45. Thirdly, the coordinate value $Xn$ of the point P1 is registered on the X axis subtracting counter 66 and fourthly, the coordinate value $Yn$ thereof is similarly registered on the Y axis subtracting counter 76. Thereafter, one word, having N bits, of the interpolation data on the X axis is shifted to the shift register 60 and subsequently, one word, also having N bits, on the Y axis is shifted and registered on the $Y$ axis shift register 70. When the interpolation data has been shifted, that is, one word is completely shifted to the shift register 70, a data shift finish signal is supplied to the flip-flop 46 which, in turn, feeds a signal "1" to the AND-gate 45.

Accordingly, the AND-gate 45 will provide clock pulse signals to the shift registers 60, 70, 80 and the counter 47. Each time a clock pulse is supplied, the shift registers 60, 70 will shift the contents thereon one bit by one bit and thus provide one pulse by one pulse on the AND-gates 61, 71. Accordingly, the AND-gate 61 provides a drive pulse to the subtracting counter 66 and AND-gates 68, 69 through the OR-gate 62 each time the clock pulse is applied to the AND-gate 61. Since the AND-gate 69 is supplied with a signal "1" from the +X register 30, the AND-gate 69 will pass the drive pulse from the OR-gate 62 to the X axis drive unit 67 to thereby rotate the pulse motor PMX in a plus direction.

Similarly, the AND-gate 71 provides a drive pulse to the Y axis subtracting counter 76 and the AND-gates 78, 79 through the OR-gate 72 only when the output from the shift register 70 is "1." Accordingly, the AND-gate 79 will supply drive pulses to the Y axis drive unit 77 intermittently to rotate the pulse motor PMY (not shown) for the Y axis. The pulse distribution along the X, Y axes is shown in FIGS. 3, 4.

When the contents of the shift registers 60, 70 have been reduced into nothing, the pulse generating circuit 48 generates a signal in cooperation with the counter 47 to reset the flip-flop 46 through the OR-gate 49 for ceasing the flow of the clock pulse signals through the OR-gate 49 for ceasing the flow of the clock pulse signals through the AND-gate 45 and also provides the computer 10 with an interpolation data demand signal by which the computer 10 will supply the next new words to the shift registers 60, 70.

It is to be appreciated that the computer 10 may calculate the interpolation data for other machine tools, while the pulse motors PMX, PMY are controlled by the data registered on the shift registers 60, 70, that is, from the time after the data shift finish signal until the interpolation data demand signal. In such a manner a small capacity computer may control a plurality of machine tools.

when the interpolation data has been shifted to the shift registers 60, 70, the computer 10 will provide the data shift finish signal to the flip-flop 46 and thus, the AND-gate 45 is opened whereby the above mentioned operation is performed.

Repeating the same operation as above described, the tool on the machine tool is carried to the point P1 from the point Po and thus, the contents of the X, Y subtracting counters 66, 76 are subtracted into nothing.

Consequently, the AND-gate 50 will provide a signal to reset the flip-flop 46 for stopping the flow of the clock pulse signals through the AND-gate 45, whereby the contouring operation directed by one block of CC data, that is, the CC data for the control from the point Po to the point P1, is completed.

In case a contouring operation on a circular line is required, the operation of the machine control tool apparatus 18, 19, or 20 is exactly the same as the case of the straight line contouring and thus, the description thereof need not be given.

Now, the operation for a point-to-point control such as, for example, a control from point Po to point P1 is described hereinunder.

After the AND-gate 50 has issued a CC data demand signal to the computer 10, the computer 10 will transmit various signals to the machine control apparatus in a predetermined sequence. Firstly, a speed signal F is supplied to the F-register 40 and the command signals +X, +Y, P to the registers 30, 32, 37. Thereafter, the coordinate value $Xn$ of the point P1 is transfered to the X axis subtracting counter 66, and subsequently, the coordinate value $Yn$ thereof is also registered on the Y-axis subtracting counter 76. Thereafter the computer 10 issues a data shift finish signal to the flip-flop 46.

When supplied with a signal from the flip-flop 46, the AND-gate 44 will pass the clock pulse signals from the V-F converter 43 to the AND-gates 63, 73, 83. The AND-gate 63 will provide drive pulses through the OR-gate 62 to the X axis subtracting counter 66 and the AND-gates 68, 69. The AND-gate 73 will provide drive pulses through the OR-gate 72 to the Y axis subtracting counter 76 and the AND-gates 78, 79. Accordingly, the pulse motors PMX, PMY are respectively rotated by the drive pulses supplied through the X axis drive unit 67 and the Y axis drive unit 77 from the AND-gates 69, 79. When the tool of the machine tool has been moved to the point P1, the contents on the subtracting counters 66, 76 are subtracted into nothing and thus, the subtracting counters 66, 76 will issue a signal "1" to close the AND-gates 63, 73 for stopping the operation of the pulse motors PMX, PMY.

It is to be appreciated that three or more axes are simultaneously controlled by one machine control apparatus and that other pulse distribution methods may also be employed with the present invention instead of the method described in the Japanese Publication 1209/1971.

Obviously, many modifications and variations of the present invention are possible in light of the above teachings. It is therefore to be understood that within the scope of the appended claims, the invention may be practiced otherwise than as specifically described herein.

What is claimed as new and desired to be secured by letters patent of the United States is:

1. In a computer controlled machine tool system including a computer for controlling the operation of a plurality of machine tools in accordance with computer control data through machine control apparatus, each of said machine control apparatus comprising:

registering means connected to said computer to receive a predetermined amount of interpolation data therefrom, said registering means being capable of providing pulses to pulse motors in accordance with said interpolation data, pulse generating means for generating a series of pulses of a frequency determined by said computer control data, the pulses being supplied to said registering means to trigger the pulses provided by said registering means, and first counter means responsive to said registering means to supply first and second signals when said registering means has finished supplying the pulses in accordance with said interpolation data, said first signals being supplied to said pulse generating means to stop the supply of the pulses to said registering means and said second signals being supplied to said computer so that said computer provides new interpolation data to said registering means.

2. Machine control apparatus according to claim 1, which further comprises direction selecting means connected to said registering means to supply the pulses therefrom to said pulse motors in directions required by the computer control data.

3. Machine control apparatus according to claim 1, which further comprises second counting means for counting the number of pulses supplied to said pulse motors from said registering means, said counting means being capable of providing third signals to said computer when the pulses according to the predetermined amount of computer control data have been supplied thereto.

4. Machine control apparatus according to claim 1, wherein said pulse generating means comprises:

first register means for receiving data concerning the mode of operations of the machine tools and the frequency of the pulses, and a pulse generator responsive to said first register means for generating a series of the pulses of the frequency determined by the computer control data, first AND-gate means for controlling the flow of the pulses therethrough in accordance with a fourth signal from said registering means and said first signals from said first counting means.

5. Machine control apparatus according to claim 1, wherein said registering means comprises a plurality of shift registers for registering a predetermined amount of interpolation data from said computer, and second AND-gate means being connected to said shift registers and said pulse generating means for allowing the passage of the pulses only when said shift registers apply a signal "1" thereto.

6. Machine control apparatus according to claim 1, wherein said first counting means comprises a counter for generating a fifth signal when a predetermined amount of the pulses is applied to said registering means, and flip-flop means responsive to said fifth signal from said counter to stop a pulse supply of said pulse generating means and to a data shift finish signal from said computer to start the pulse supply thereof.

7. Machine control apparatus according to claim 1, which further comprises gate means connected to said pulse generating means for controlling the flow of the pulses, direction selecting means connected to said gate means to supply the pulses to said pulse motors in the directions required by the computer control data, and second counting means connected to said gate means for counting the number of the pulses supplied to said pulse motors, said second counting means being capable of providing the third signal to said computer and a sixth signal to said gate means when the pulses according to a predetermined amount of computer control data have been supplied thereto whereby said gate means stops the flow of the pulses therethrough and said computer provides new information to said machine control apparatus.

8. Machine control apparatus according to claim 1, wherein said first counting means comprises a counter for generating the second signal by which said computer transmits new interpolation data to said registering means.

9. Machine control apparatus according to claim 2, wherein said direction selecting means comprises second register means for registering information from said computer concerning the direction of rotation of said pulse motors, and third AND-gate means connected to said second register means and said registering means to apply the pulses to said pulse motors in selected directions.

10. Machine control apparatus according to claim 3, wherein said second counting means comprises a plurality of subtracting counters connected to said computer for registering information according to a predetermined amount of the computer control data, each of said subtracting counters being capable of counting the pulses supplied to said pulse motors and generating a seventh signal when all the pulses according to the predetermined amount of the computer control data have been applied thereto, and fourth AND-gate means connected to all of said subtracting counters for applying the third signal to said computer when all of said subtracting registers apply the seventh signal thereto, so that said computer applies new interpolation data to said registering means and information according to new computer control data to said subtracting counters.

11. In a computer controlled machine tool system including a computer for controlling the operation of a plurality of machine tools in accordance with computer control data through machine control apparatus, each of said machine control apparatus comprising:

pulse generating means for generating a series of pulses of a frequency determined by the computer control data and for supplying the pulses to pulse motors of said machine tools.

first counting means for controlling the supply of the pulses from said pulse generating means to said pulse motors, direction selecting means operably connected to said pulse generating means to apply the pulses in the directions required by the computer control data, and second counting means for counting the number of the pulses supplied to said pulse motors, said second counting means being capable of providing a third signal to said first counting means and said computer when the pulses according to a predetermined amount of the computer control data have been supplied thereto, whereby said first counting means stops the supply of the pulses from said pulse generating means to said pulse motors until information according to new computer control data has been registered by said second counting means.

12. Machine control apparatus according to claim 11, which further comprises gate means provided between said pulse generating means and said direction selecting means, said gate means being operable to stop the flow of the pulses therethrough when the pulses according to a predetermined amount of the computer control data have been supplied to said pulse motors.

* * * * *